(12) United States Patent
vonBrethorst

(10) Patent No.: US 6,560,131 B1
(45) Date of Patent: May 6, 2003

(54) STORED ENERGY POWER SYSTEM

(76) Inventor: William F. vonBrethorst, P.O. Box 340, Ennis, MT (US) 59729

( * ) Notice: Subject to any disclaimer, the term of this patent is extended or adjusted under 35 U.S.C. 154(b) by 0 days.

(21) Appl. No.: 10/076,015

(22) Filed: Feb. 13, 2002

Related U.S. Application Data
(60) Provisional application No. 60/268,450, filed on Feb. 13, 2001.

(51) Int. Cl.[7] .............................. H02M 1/00; H02B 1/04
(52) U.S. Cl. ........................................ 363/146; 361/673
(58) Field of Search .............................. 363/34, 37, 95, 363/131, 144, 146; 361/18, 20, 115, 601, 641, 652, 656, 673; 307/43, 48, 65, 66, 71–76

(56) References Cited

U.S. PATENT DOCUMENTS

| | | |
|---|---|---|
| 4,059,771 A | 11/1977 | Jacobs et al. |
| 4,200,904 A | 4/1980 | Doan |
| 4,315,163 A | 2/1982 | Bienville |
| 4,581,572 A | 4/1986 | Yoshiyuki |
| 4,667,142 A | 5/1987 | Butler |
| 4,719,550 A | 1/1988 | Powell |
| 4,742,291 A | 5/1988 | Bobier |
| 4,994,684 A | 2/1991 | Lauw |
| 5,680,032 A | 10/1997 | Pena |
| 5,982,138 A | * 11/1999 | Krieger ...................... 320/105 |

* cited by examiner

*Primary Examiner*—Matthew Nguyen
(74) *Attorney, Agent, or Firm*—Richard C. Conover

(57) ABSTRACT

A stored energy system is provided for delivering AC electrical power to a load. This system includes a single housing containing within a battery bank for storing DC power, and an inverter for receiving either DC power or AC power and converting DC power to AC power. The stored electrical system includes five circuit breakers mounted on the outside surface of the housing. Twist lock plugs are connected to each of the circuit breakers for removably connecting input power sources and output loads with the circuit breakers. A first circuit breaker is connected to a solar power source. A second circuit breaker is connected to a wind generator. A third circuit breaker is connected to a generator for generating AC power. A fourth circuit breaker is connected to a utility supplying AC power. A fifth circuit breaker is connected to the outside AC power load.

7 Claims, 3 Drawing Sheets

US 6,560,131 B1

STORED ENERGY POWER SYSTEM

This application claims the benefit of Ser. No. 60/268,450, filed Feb. 13, 2001.

BACKGROUND OF THE INVENTION

The present invention relates to an electrical battery storage system enclosed in a single housing ready for connecting directly to solar and/or wind electrical power generation systems and further ready to be connected directly to a home electrical system, for example.

A need exists for a single "plug-in" unit which can be used with persons using alternate sources of energy such as wind or solar power. A need exists for a unit which can be plugged into these solar and wind power generation systems and then convert the DC power obtained from these alternate sources to AC current which can then be used in a home, for example, to power lights and other electrical appliances. In the past, when solar or wind power has been used as an alternate source for home power, it has been necessary to hire an electrician to wire all the components together. This is expensive and time consuming. The present invention meets a need by providing a single unit which is a "plug-in" type unit fully compliant with the National Electric Code. The user simply plugs in the alternate sources of power such as wind or solar power and plugs in the input line to the home electrical system. All of the components are pre-wired and in an operable condition. Set-up is done quickly and is used for supplying alternate power to a home. Further, the present system provides a system for supplementing or replacing electrical power from an electrical power utility.

SUMMARY OF INVENTION

A stored energy system is provided for delivering AC electrical power to a load. This system includes a single housing in which is housed a battery bank for storing DC power, and an inverter for converting DC electrical power to AC electrical power. The inverter includes an input terminal connected to, a source of DC electrical power and an output terminal for delivery of AC electrical power. The inverter further includes internal circuitry which accepts an AC electrical power input and provides this AC electrical power to the output AC electrical power terminal of the inverter. The stored electrical system includes five circuit breakers mounted on the outside surface of the housing. Twist lock plugs are connected to each of the circuit breakers for removably connecting electrical input power sources and electrical output loads to the circuit breakers. A first circuit breaker is connected to an outside solar panel DC electrical power source. A second circuit breaker is connected to a DC electrical power wind generator. A third circuit breaker is connected to a generator for generating AC electrical power. A fourth circuit breaker is connected to utility supplying AC electrical power. A fifth circuit breaker is connected to the outside AC electrical power load.

DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
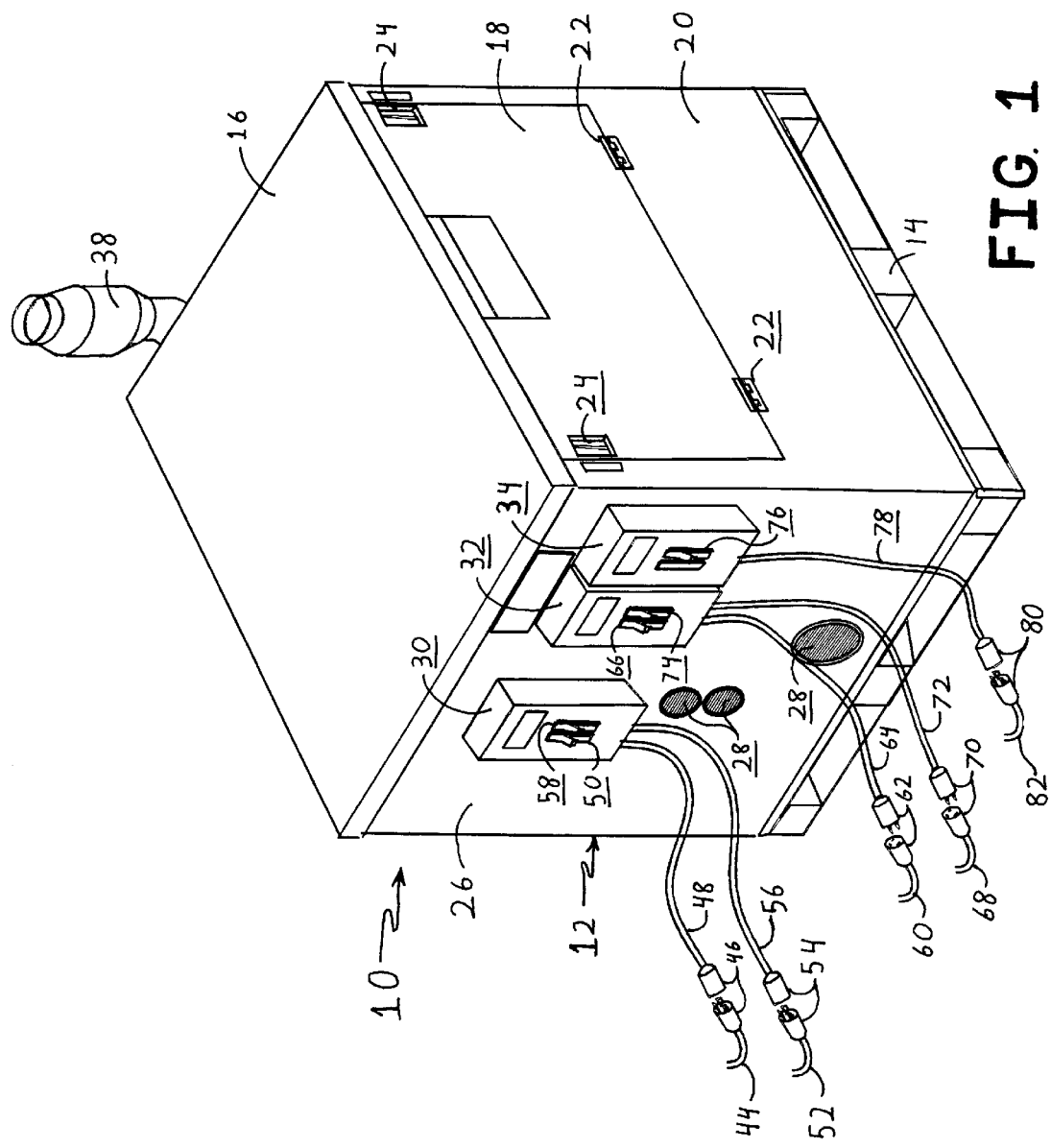
FIG. 1 is a front perspective elevational view of a stored energy power system according to the present invention.
Figure 2:
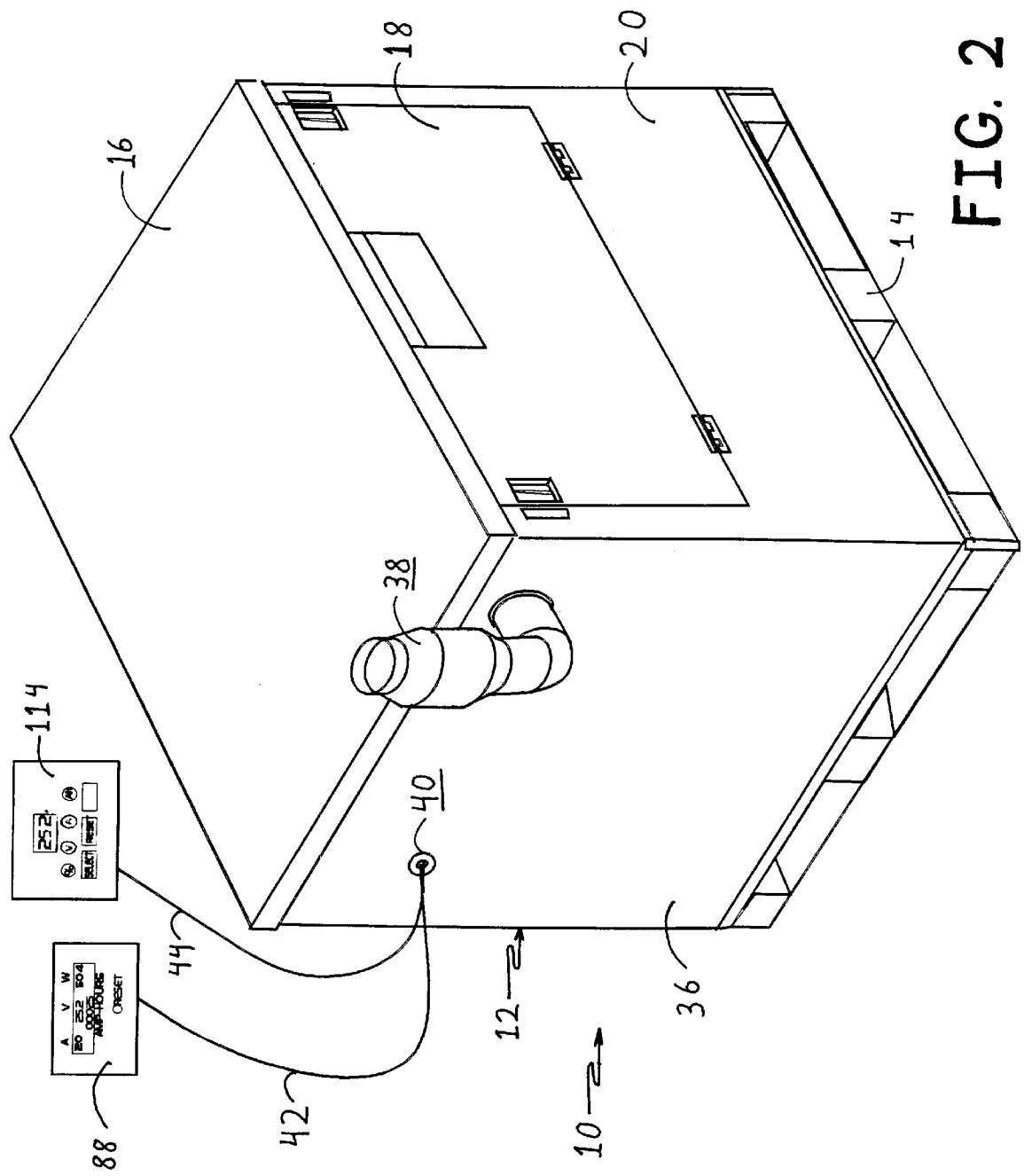
FIG. 2 is a rear perspective elevational view of the invention shown in FIG. 1.
Figure 3:
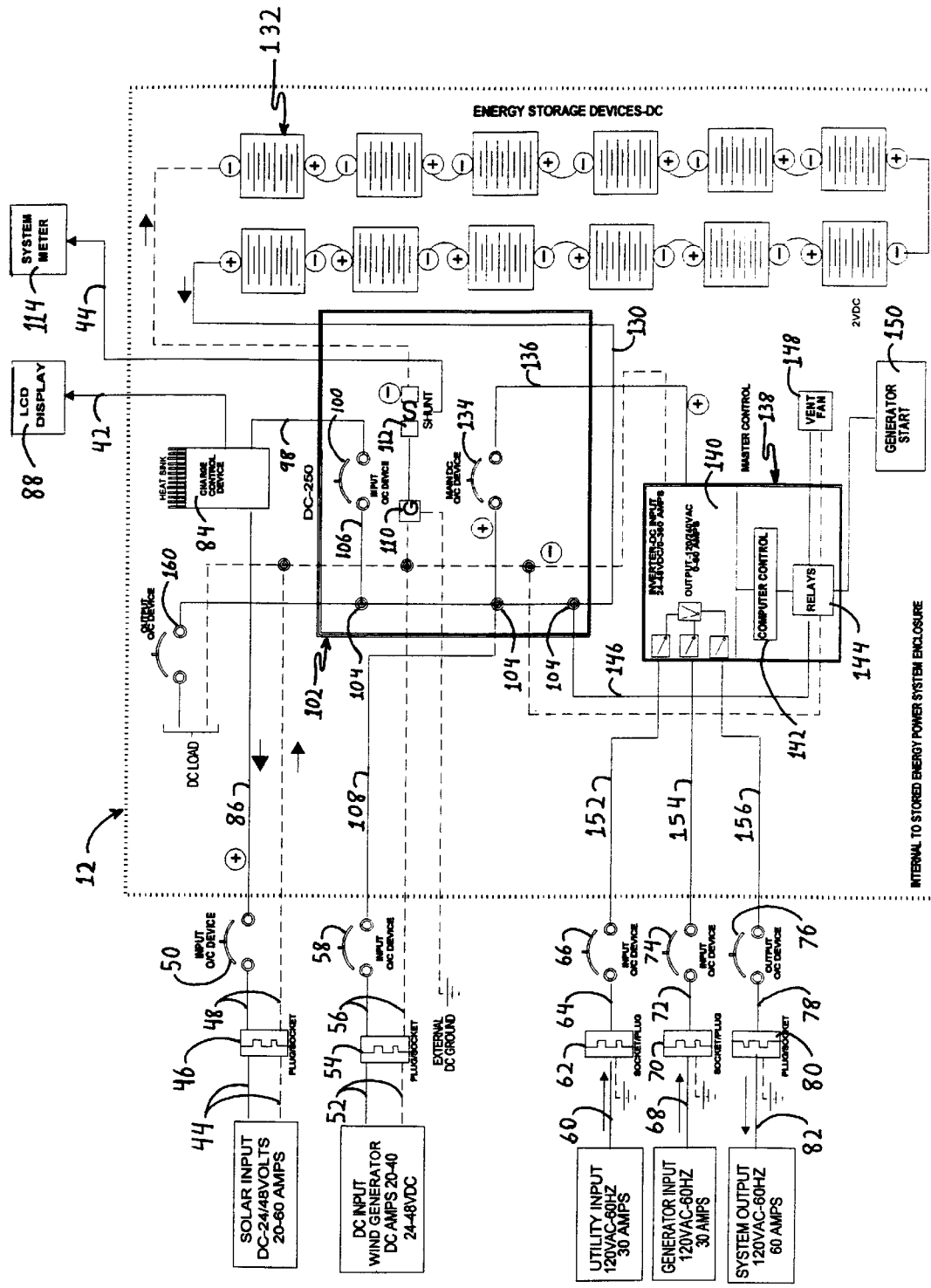
FIG. 3 is an electrical schematic view of the invention shown in FIG. 1.

An electrical schematic of the stored energy power system 10 of the present invention is shown in FIG. 3. The stored energy power system 10 is housed in a housing 12, as shown in FIGS. 1 and 2. Components are mounted within the housing 12 in a conventional manner. The housing rests on a pallet stand 14 and has a removable top lid 16. The housing 12 is also provided with an inspection door 18 which is hingedly connected to a wall 20 of the housing 12 with hinges 22. A pair of latches 24 are used to secure the inspection door 18 in a closed position, as shown in FIG. 1. A wall 26 of housing 12 has three screen covered vent openings 28 as shown in FIG. 1. Further, three circuit breaker boxes 30, 32 and 34 are mounted to the outer face of wall 26, as shown in FIG. 1, in accordance with the National Electric Code.

As shown in FIG. 2, a wall 36 of housing 12 has a fan exhaust pipe 38 mounted thereto. Further, a grommeted opening 40 is provided in wall 36 to allow cables 42 and 44 to exit from the interior of housing 12.

With reference to FIG. 3, a power outlet from a conventional wind generator (not shown) is led to stored energy power system 10 through cable 44 which is connected to the male portion of a twist lock plug 46. The female portion of the plug 46 is connected with cable 48 to a circuit breaker 50 located in circuit breaker box 30, as shown in FIG. 1.

In a similar manner, power output from conventional solar panels (not shown) is also led to the stored energy power system 10 through cable 52. Cable 52 is connected to the male portion of a twist lock plug 54. The female side of plug 54 is connected with cable 56 to a circuit breaker 58 located in circuit breaker box 30, as shown in FIG. 1.

In addition to these sources of power, there are also two alternate sources available if the wind and solar sources fail. Power from a conventional power generator (not shown) is led to energy storage power system through cable 60. Cable 60 is connected to the female portion of a twist lock plug 62. The male portion of plug 62 connected by cable 64 to a circuit breaker 66 located in circuit breaker box 32. Power from a utility electrical power grid (not shown) is led to the stored energy power system 10 through cable 68. Cable 68 is connected to a female portion of a twist lock plug 70. The male portion of plug 70 is connected by cable 72 to a circuit breaker 74 located in circuit breaker box 32.

AC power at 110 volts, 60 cycles, is directed from the stored energy power system 10 through a circuit breaker 76 located in circuit breaker box 34. The circuit breaker 76 is connected via cable 78 to the female portion of a twist lock plug 80. The male portion of the twist lock plug 80 is connected to an output cable 82 which in turn is connected to an AC load such as the electrical system in a house, for example.

Once, the five cables are plugged into the appropriate plugs, the internal electrical components of stored energy power system 10 within the housing 12 can function to provide stored, or generated, power to output cable 82.

With reference to FIG. 3, the circuit breaker 50 is connected to a conventional charge control device 84 through cable 86. The charge control device in a preferred embodiment is one provided by Xantrax Technologies. The charge control device is connected through cable 42 to an LCD display 88. In a preferred embodiment, this LCD display is one obtained from Xantrax Technologies. This LCD, as shown in FIG. 2, is toggled to display DC voltage across the battery bank 132, the DC amperage of the solar input, the DC wattage provided by the solar input and the cumulative watt hours and amp hours provided by solar input.

The output of the charge output device 84 is directed through cable 98 to an internal circuit breaker 100 provided in a conventional DC service panel 102. In a preferred embodiment, the DC service panel is a, DC-250 obtained from Xantrax Technologies.

The internal circuit breaker 100 is connected to a main power bus 104 with cable 106.

The circuit breaker 58 is connected to the main power bus 104 via cable 108. The DC service panel 102 includes an internal ground terminal 110 connected to an external DC ground, as shown. The ground terminal 110 is in line with an internal shunt 112, which in turn is connected via cable 44 to a system meter 114. In a preferred embodiment, the system meter 114 is a Model TM-500 obtained from Xantrax, Technologies. This meter has a toggle switch allowing the meter to display the charge level of the battery bank 132, the DC voltage across battery bank 132, real time amperage in and out of the system 10 and the am hours into or out of the system 10.

The main power bus 104 is also connected via cable 130 to the positive side of a battery bank 132, as shown in FIG. 3.

The main power bus 104 is also connected to an internal circuit breaker 134 provided within the DC service panel 102. The circuit breaker 134 is connected via cable 136 to an input terminal of a power inverter 138. In a preferred embodiment, the power inverter 138 is a Xantrax Power Inverter manufactured by Xantrax Technologies. The power inverter 138 includes an internal inverter 140 for converting DC power to AC power, a programmable computer control 142, and a number of relays 144, which are controlled by the computer. The main power bus 104 provides a power input to the relays 144 through cable 146. The relays 144 are used to operate a vent fan 148, and also to energize the starting circuit 150 of a power generator (not shown). When the exhaust fan 148 is operating, it exhausts air within the housing 12 through the exhaust pipe 38, as shown in The circuit breaker 66, connected to the power utility, is connected to the inverter 140 through cable 152. The circuit breaker 74 from the generator is connected to the inverter 140 with cable 54. The AC output circuit breaker 76 is connected to the output of inverter 140 with cable 156.

In a preferred embodiment, the battery bank 132 is made up of twelve batteries. Each of these batteries is a 2-volt battery having a capacity of 941 amp hours. The twelve batteries are connected together in series to form one 24-volt.

A DC load may be connected to the system at the user's option through circuit breaker 160 connected to the main power bus 104, as shown in FIG. 3.

Also, in FIG. 3, the internal grounding leads are shown as dashed lines 162. The solar cells and the wind power generator are all connected to internal ground terminal 110 which is also connected to the negative side of battery bank 132 and to an external ground as shown.

The utility input, the generator input and the system output are all grounded separately outside the system 10.

In operation a user plugs the outside solar cells into plug socket 46 and the wind generator into plug socket 54. The wind power generator is selected so as to produce power at 24-volt DC Also, for back-up, cable 60, connected to an electrical utility, is plugged into plug socket 62, and a stand-by generator is plugged into the system 10 with the plug 70. The standby-by generator and the electrical utility provide incoming power at 110-volt AC. Cable 82 is then plugged into socket 80 for connecting the system 10 to the residence input power cables. Once all of these cables are connected, solar power and wind generated power are stored within the battery storage bank 132, and this power is converted with the inverter to AC power to supply 110-volt AC, 60 cycle power to a house. The system 10 is truly a "plug-in" type system. All that is required by the user is to plug the various cables into the housing 12 as described above. If the owner ever wants to move the unit, all that needs to be done is to turn the system off and disconnect the five cables described. The unit then can be moved to another location.

The installed components within the stored energy power system 10 are all wired to conform to the NEC (National Electric Code) 690. The installation of the system 10 requires little expertise because all the necessary components are pre-installed and properly connected within housing 12 before the unit is delivered. All that remains to be done is to plug in the five cables previously described, which is an easy task, even for relatively unskilled laborers.

While the fundamental novel features of the invention have been shown and described, it should be understood that various substitutions, modifications, and variations may be made by those skilled in the art without departing from the spirit or scope of the invention. Accordingly, all such modifications or variations are included in the scope of the invention as defined by the following claims.

I claim:

1. A stored energy system for delivery of AC electrical power to a load comprising:

a housing;

a source of DC electrical power;

a first circuit breaker mounted on an outside surface of the housing;

a removable plug means electrically connected to the first circuit breaker for electrically connecting the source of DC electrical power to the first circuit breaker;

a battery bank having a positive terminal and a negative terminal;

the first circuit breaker electrically connected to the positive terminal of the battery bank;

a power inverter means mounted within the housing for converting DC electrical power to AC electrical power;

the inverter having an input terminal for receiving DC electrical power and an output terminal for delivery of AC electrical power;

the positive terminal of the battery bank electrically connected to the input terminal of the inverter;

a second circuit breaker mounted on an outside surface of the housing;

the output terminal of the inverter electrically connected to the second circuit breaker; and a removable plug means connected to the second circuit breaker for electrically connecting the second circuit breaker to the AC load.

2. The stored energy system according to claim 1 wherein the source of DC electrical power includes a source of solar generated DC electrical power.

3. A stored energy system according to claim 2 further including a regulator means for regulating the power delivered to the battery bank from the source of DC electrical solar power.

4. A stored energy system according to claim 1 wherein the source of DC electrical power includes a source of wind generated DC electrical power.

5. A stored energy system according to claim 1 further including:
   a generator source of AC power;
   a third circuit breaker mounted on an outside surface of the housing;
   a removable plug means electrically connected to the third circuit breaker for electrically connecting the generator source of AC electrical power to the third circuit breaker; and
   wherein the inverter further includes an input terminal for receiving AC power and means for electrically connecting the input terminal for AC power to the output terminal; and
   means for electrically connecting the third circuit breaker to the AC input terminal of the inverter.

6. A stored energy system according to claim 1 further including:
   a utility source of electrical AC power;
   a third circuit breaker mounted on the outside surface of the housing;
   a removable plug means electrically connected to the third circuit breaker for electrically connecting the utility source of electrical power to the third circuit breaker; and
   wherein the inverter further includes an input terminal for receiving AC power and means for electrically connecting the input terminal for AC power to the output terminal; and means for electrically connecting the third circuit breaker to the AC input terminal of the inverter.

7. A stored energy system for delivery of AC electrical power to a load comprising:
   a housing;
   a source of solar generated DC electrical power;
   a first circuit breaker mounted on an outside surface of the hosing;
   a removable plug means electrically connected to the first circuit breaker for electrically connecting the source of solar generated DC electrical power to the first circuit breaker;
   a battery bank having a positive terminal and a negative terminal;
   the first circuit breaker electrically connected to the positive terminal of the battery bank;
   a source of wind generated DC electrical power;
   a second circuit breaker mounted on an outside surface of the housing;
   a removable plug means electrically connected to the second circuit breaker for electrically connecting the source of wind generated DC electrical power to the second circuit breaker;
   the second circuit breaker electrically connected to the positive terminal of the battery bank;
   a power inverter means mounted within the housing for converting DC electrical power to AC electrical power;
   the inverter having an input terminal for receiving DC electrical power and an output terminal for delivery of AC electrical power;
   the positive terminal of the battery bank electrically connected to the input terminal of the inverter;
   a third circuit breaker mounted on an outside surface of the housing;
   the output terminal of the inverter electrically connected to the third circuit breaker;
   a removable plug means connected to the third circuit breaker for electrically connecting the third circuit breaker to the AC load;
   a generator for providing a source of AC electrical power;
   a fourth circuit breaker mounted on an outside surface of the housing;
   a removable plug means electrically connected to the fourth circuit breaker for electrically connecting the generator source of AC electrical power to the fourth circuit breaker;
   wherein the inverter further includes an input terminal for receiving AC power and means for electrically connecting the input terminal for AC power to the output terminal;
   means for electrically connecting the fourth circuit breaker to the AC input terminal of the inverter;
   a utility source of AC electrical power;
   a fifth circuit breaker mounted on the outside surface of the housing;
   a removable plug means electrically connected to the fifth circuit breaker for electrically connecting the utility source of AC electrical power to the fifth circuit breaker; and
   means for electrical connecting the fifth circuit breaker to the AC input terminal of the inverter.

* * * * *